United States Patent [19]

Park et al.

[11] Patent Number: 4,902,367

[45] Date of Patent: Feb. 20, 1990

[54] APPARATUS AND METHOD FOR THE PREPARATION OF MOSAIC FLOOR DECORATIONS

[75] Inventors: Ho J. Park; Jin Y. Choi, both of Cheongju; Seong C. Park, Bucheon; Gi H. Yang, Cheongju, all of Rep. of Korea

[73] Assignee: Lucky, Ltd., Seoul, Rep. of Korea

[21] Appl. No.: 204,023

[22] Filed: Jun. 8, 1988

[30] Foreign Application Priority Data

Jun. 19, 1987 [KR] Rep. of Korea ........................ 87-6232
Jun. 19, 1987 [KR] Rep. of Korea ........................ 87-6233

[51] Int. Cl.⁴ ................................................ B32B 31/10

[52] U.S. Cl. .................................... 156/297; 156/209; 156/390; 156/560; 222/533

[58] Field of Search ............... 156/209, 219, 220, 297, 156/298, 390, 560; 193/17; 222/527, 533; 427/202; 264/112, 119, 126

[56] References Cited

U.S. PATENT DOCUMENTS 3,056,224 10/1962 Almy et al. ............................ 428/46
3,170,808 2/1965 Almy et al. .
3,265,548 8/1966 Harkins et al. ........................ 156/79
3,383,442 5/1968 Mountain ......................... 222/533 X
3,682,741 8/1972 Elliott et al. ........................ 156/298

*Primary Examiner*—Robert A. Dawson
*Attorney, Agent, or Firm*—Birch, Stewart, Kolasch & Birch

[57] ABSTRACT

The present invention relates to an apparatus and to a method for the preparation of mosaic floor decorations. More particularly, the present invention relates to an apparatus and to a method for the preparation of mosaic floor decorations which conveniently and uniformly arrange the dispersed chips in order to achieve an aesthetically pleasing design. The method comprises harmonizing chip pieces having various colors and shapes by uniformly arranging the chips by dispersing them upon a substrate by using a sliding-table having many different incline angles.

10 Claims, 2 Drawing Sheets

APPARATUS AND METHOD FOR THE PREPARATION OF MOSAIC FLOOR DECORATIONS

FIELD OF THE INVENTION

The present invention relates to an apparatus and to a method for the preparation of mosaic floor decorations. More particularly, the present invention relates to an apparatus and to a method for the preparation of mosaic floor decorations which conveniently and uniformly arrange dispersed chips in order to achieve an aesthetically pleasing design. The method comprises harmonizing chip pieces having various colors and shapes and uniformly arranging the chips by dispersing them upon a substrate by using a sliding-table having many different incline angles.

BACKGROUND OF THE INVENTION

For centuries people have used various types of floor decorations in order to decorate their living areas. For instance, mosaic floors have been made using chips of stone, glass, wood, and ceramic materials or the like which have a wide variety of colors. However, it has been difficult to uniformly arrange these small chips onto a substrate layer.

In the past, the first step in preparing mosaic flooring using the various types of chips discussed above involves suitably arranging the chips on a substrate and applying heat and pressure. The pressure is applied by using a press or a roller so that the chips will adhere to the substrate and maintain their predetermined arrangement. However, the chips often overlap and lose their desired arrangement. Therefore, the aesthetic value of the final product and the productivity for producing the final product are decreased.

More recently, in order to solve the abovementioned problems, a method for the arrangement of chips using vibrations has been invented. This method is an epoch-making development in the design of a process for preparing floor decorations. For example, U.S. Pat. Nos. 3,056,224 and 3,170,808 disclose a process for preparing mosaic floor decorations, which comprises dispersing mosaic-patterned chips onto a substrate which has been coated with an adhesive agent, passing the substrate through a vibrator which shakes the chips and arranges them uniformly so that none of the chips protrude, filling the areas between the chips with temperature-sensitive dry-powder resin materials, and applying heat under pressure to fuse the substrate. As a result, the chips are arranged and become adhered to the substrate and the abovementioned powder resin materials fill the areas between the chips.

Another useful process has been described in U.S. Pat. No. 3,265,548. This process comprises applying a sol type resinous composition to a substrate by passing the substrate through a coating apparatus, dispersing chips made of a plastic composition while vibrating the substrate with a vibrator located under the substrate which serves not only to uniformly disperse the chips but also to deposit the chips inside the resinous composition, heating the chips deposited inside the resinous composition, flattening the chip covered substrate with rollers while maintaining sufficient pressure to flatten the surface without changing the arrangement of the chips while maintaining the temperature below the fusion temperature, and conventionally embossing or grinding the chip covered substrate in order to remove uneven portions.

Similarly, using the same method as described above, a method has been developed wherein after dispersing the chips on a plate and vibrating the plate itself to arrange the chips roughly evenly, the plate was put on the substrate of the floor decorations and the substrate itself was vibrated in order to arrange the chips uniformly. Furthermore, a process has also been developed which comprises passing the chips which have been roughly arranged in the same vibrating manner as described in the above process between a pair of rollers, wherein the gap of the rollers is adjusted to arrange the chips uniformly. However, there are such problems in the former method that the arrangement condition has to change according to thickness deflection and surface tension of the substrate which is being used. In addition, problems with the latter process include a situation wherein the chips do not appear to be naturally arranged because of the large space between the chips.

SUMMARY ON THE INVENTION

The method of the present invention is designed to solve the abovementioned problems. Accordingly, one object of the present invention is to provide a method for the preparation of mosaic floor decorations having a more beautiful appearance and a higher endurance or durability than those prepared by the prior art processes. The present method uniformly and conveniently arranges chips on a substrate by arranging the chips upon a sliding-table which supplies the chips at a given rate according to the vibration principle of a plate, and then dispersing and arranging the chips intact on a substrate in order to improve the compatibility of the substrate and the chips. More specifically, the method of the invention comprises coating a substrate with base sol, dispersing and uniformly arranging the chips upon the substrate by supplying the chips through a sliding-table having many different incline angles and which is provided with a fixed-arrangement plate at the end of the sliding-table, adhering the chips to the base sol by heat-treatment, embossing, filling the spaces between the chips with filling sol, and heat-treating and embossing the chip covered substrate in order to prepare mosaic floor decorations.

The invention may further comprise forming a transparent resin layer on the surface of the chips after the second heat-treatment step, and applying a third heat-treatment and embossing step in order to prepare the mosaic floor decorations.

Another object of the present invention is to provide an apparatus useful for carrying out the abovementioned method. The apparatus for the preparation of a mosaic floor decoration comprises a sliding-table having many different incline angles, wherein the mean of the incline angles to a horizontal plane of a slope in the sliding-table is 5–20° and wherein different incline angles in the slope are continuously joined to form an inclined shape, a fixed-arrangement plate operatively associated with the end of sliding-table, and means for vibrating the sliding table.

DETAILED DESCRIPTION OF THE INVENTION

Figure 1:
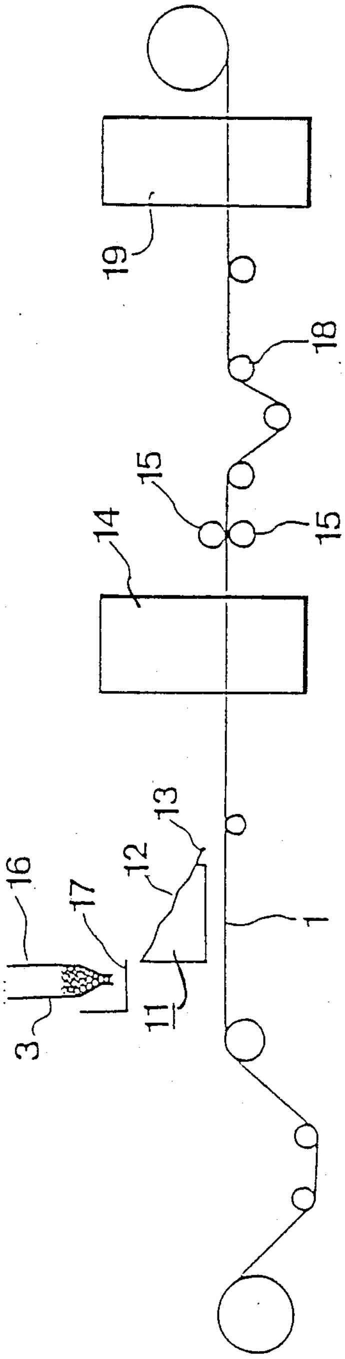
FIG. 1 is a schematic view which represents the method of preparing mosaic floor decorations in accordance with the invention.

According to the present invention, a base sol layer having a thickness of 0.05 to 0.5 mm, and more preferably 0.3 to 0.5 mm in thickness, is coated on a substrate before arranging the chips. The chips are arranged on the abovementioned base sol layer by a process which comprises sliding the chips on a sliding-table having many different incline angles while the sliding-table is vibrating from side to side by a mechanical or electrical means, and controlling the random sliding rate of the chips in order to arrange the chips on a fixed-arrangement plate installed on the sliding table at one end thereof in order to achieve a uniform mosaic shape.

The base sol including the chips is heat-treated at a temperature of about 80° to 250°C., preferably about 150° to 250° C., in order to cause the chips to adhere to the base sol layer. The heat-treated layer is then passed through a pair of Embo Units,(e.g. means for embossing a sheet) in order to make the layer thickness even.

The space between the chips is filled with a filling sol which has a viscosity of about 500 to 4,000 CPS, preferably about 500 to 2,000 CPS. The filling sol coating the surface of the chips is completely removed with a rubber plate or a thin metallic plate. The sheet which is obtained is again heat-treated at a temperature of about 80° to 250° C., preferably about 150° to 250° C., and then passed through the same Embo units or embossing means as mentioned above in order to prepare mosaic floor decorations having a smooth surface.

The invention may further comprise forming a surface transparent resin layer having a thickness of 0.05 to 0.3 mm after removing the filling sol coated from the surface of chips and then heat-treating. Subsequently, the sheet is again heat-treated at a temperature of about 150° to 250° C., preferably about 180° to 250° C., and the sheet is then passed through the Embo Units (e.g. embossing means).

The substrate of the present invention may be any conventional substrate. For example, the sheet may be paper, a fiber glass mat impregnated with plastisol, or asbestos paper. Moreover, the thickness of the substrate is suitably in the range about 0.5 to 1.0 mm.

The base sol layer coated on the substrate may be resinous sol materials which are adhesive and which fix the chips to the substrate. The base sol composition contains about 100 parts by weight of paste resin, about 40 to 70 parts by weight of plasticizer, about 2 to 8 parts by weight of stabilizer and an appropriate amount of pigment. Preferably, the base sol composition comprises 100 parts by weight of paste resin, 60 parts by weight of plasticizer, 4.0 parts by weight of stabilizer and about 0.1 to 1.0 parts by weight of pigment.

The base sol layer is an adhesive resin layer which is formed by a conventional method. The thickness of the base sol layer is 0.05 to 0.5 mm, preferably 0.3 to 0.5 mm. The adhesiveness between the chips and the substrate is decreased when the thickness of the base sol layer is less than 0.05 mm. The beauty of the floor is spoiled by the stain of the chip surface when the thickness of the base sol layer is more than 0.5 mm, or more than two thirds the thickness of a chip.

The invention will be further understood from the following detailed description when read in conjunction with the accompanying drawings.

In the apparatus for the preparation of a mosaic floor decoration according to the present invention, the apparatus for arranging chips(3) on a substrate(1) is established by a sliding-table(11) whose length is at least 0.5 m and which has many different incline angles. The mean of the incline angles to the horizontal plane of the slope(12) in the sliding-table(11) is 5–20°. Many different incline angles in the slope(12) are continuously joined to form the incline shape. A fixed-arrangement plate(13) is operatively associated with or connected to the end of sliding-table(11). Also, the sliding-table(11) may be vibrated from side to side by mechanical or electrical means. Accordingly, chips(3) are randomly slid onto the sliding-table (11) by vibrating, uniformly arranged in a mosaic design by the fixed-arrangement plate(13), and homogenously dispersed on the substrate(1).

The apparatus of the present invention further comprises a first heater(14), second heater(19), a pair of Embo Units (e.g. embossing means) (15), a hopper(16) for storing the chips(3), a vibration plate (17) which selects the chips(3) of a suitable size and supplies them to the slope(12), and a filling unit(18).

Various types of chips(3) may be used for the invention. For example, chips(3) comprising compositions in accordance with Table 1 may be prepared into a sheet having a thickness of 1.4 mm. The sheet may be cut into shapes such as a hexahedron of 2 mm×2mm×0.8 mm to 10 mm×10 mm×1.4 mm in size, preferably 5 mm ×6 mm1.4 mm in size. Alternatively, the sheet may be broken into fragments by a pulverizer and the broken and amorphous fragments having a size of about 2 mm to 25 mm may be selected.

TABLE 1

| Composition | Part (by weight) |
|---|---|
| Straight resin | 100 |
| Calcium carbonate | 100~400 |
| Plasticizer | 20~40 |
| Stabilizer | 4~8 |
| Pigment | appropriate amount |

The chips(3) prepared in the above manner may be placed into the hopper(16) located on the top of the sliding-table(11). The chips inside the hopper(16) are dropped onto the vibration plate(17) and only then are the chips(3) of the appropriate size supplied to the slope(12) of the sliding-table(11).

The sliding-table(11) is at least 0.5 m in length and has many different incline angles. The many different angles of the slope(12) are continuously joined to form the inclined shape and the mean angle to the horizontal plane of the slope(12) is 5° to 20°. Moreover, the sliding-table(11) may be vibrated by a mechanical or electrical means.

The randomly applied chips from the vibration plate(17) are slowly dispersed according to the slope(12) of the sliding-table(11) by vibration and by the inclined angles of the slope(12). Furthermore, the sliding rate of the chips is changed pursuant to the various coefficient of friction of the slope(12) and the different incline angles. This controls the collection and spread of the chips which repeatedly allows some of the overlapping chips(3) to be dispersed on the slope(12) and which arranges the chips uniformly and naturally.

There are preferably 3 to 10 inclines of the slope(12). In addition, the slope(12) is suitably made of a shape in which relatively large and small inclined angles are alternatively continued in order to properly maintain the sliding rate of the chips(3). Therefore, the number of chips(3) sliding on the slope(12) is constantly retained and unexpected movements of the chips are restrained or prevented.

Figure 2:
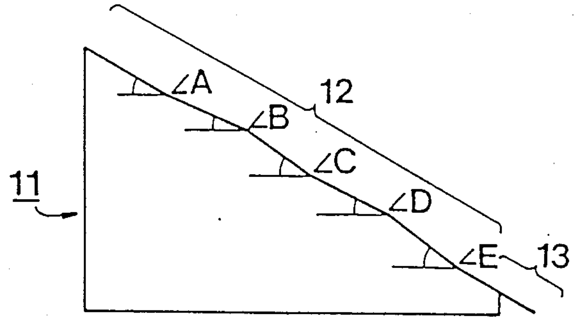
FIG. 2 is a longitudinal-sectional view of the sliding-table of FIG. 1.

Referring to FIG. 2, the slope(12) comprises five inclines wherein the angles of the slope(12) to the horizontal plane are, for example, as follows: angle A is about 13° to 20°, angle B is about 8° to 13°, angle C is about 13° to 20°, angle D is about 7° to 12°, and angle E is about 11° to 17°.

The chips(3) slide on the slope(12) as they arrive at the fixed-arrangement plate(13) which is operatively associated or attached to the end of sliding-table(11). Because the plate(13) is made from materials having one half (½) to four (4) times the coefficient of friction as compared to the quality of the material of the slope(12), the chips(3) slide more slowly on the plate(13) than on the slope(12). The chips(3) are densely and uniformly arranged on the plate(13) without spaces between the chips(3) and without overlapping. The chips(3) are then dropped from the plate(13) onto the substrate (1). Because the fixed-arrangement plate(13) and the substrate(1) are very closely located, the chips(3) are substantially supplied to the moving substrate and covered by the base sol layer(2) as a result of being dropped onto the substrate.

The velocity of the moving substrate(1) is related to the linear velocity and may influence the arrangement of chips (3). In addition, the chips(3) may be arranged without any problems such as overlapping and insufficient spacing when the linear velocity is low, for example, 1 to 3 m/min, preferably 1 to 2 m/min. Problems such as overlapping and insufficient spacing may damage the quality of the end product. Moreover, broken chips(3) resulting from the overlapping thereof may be eliminated by the embossing procedure using the Embo Unit, (e.g. embossing means) (15).

After arranging the chips(3) on the substrate(1), the substrate(1) is gelled by heat-treatment at a temperature of about 150° to 250° C. in a heater(14) to completely adhere the chips(3) to the substrate(1). The resultant sheet is passed through a pair of Embo Units (e.g. embossing means) (15) whose gaps are controllable in order to remove the varying thickness and to wholly even the substrate(1) which has been covered with the chips(3).

The spaces between the chips(3) are then filled in the filling Units(18)with the filling sol(4) having a viscosity of about 500 to 4,000 CPS. The filling sol(4) which adheres to the surface of the chips(3) is completely removed by using a rubber plate or a thin metallic plate. The resultant sheet is passed through a heater(19) having a temperature of about 80° C. to 250° C. to gel again. The sheet is then passed through Embo Units (not shown in FIG. 1) in order to make the surface of the product smooth.

Furthermore, the present invention further contemplates applying a transparent resin layer of 0.05 to 0.3 mm thickness on the layer of the chips(3) after filling the filling sol(4) and heat-treating to form a gel. A third heat-treatment at a temperature of 150° to 250° C. may be applied and the resultant sheet may be passed through the Embo Units(not shown in FIG. 1) as discussed above in order to even out the surface of the product.

Figure 3:
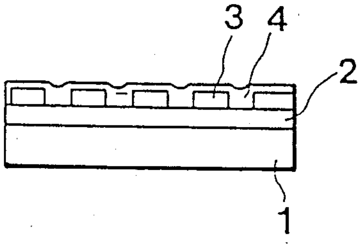
FIG. 3 is a cross-sectional view of one embodiment prepared according to FIG. 1.
Figure 4:
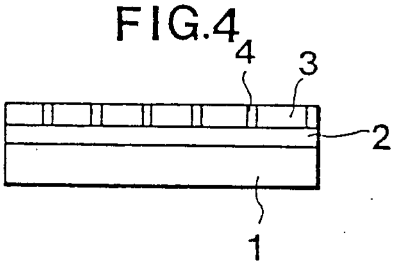
FIG. 4 is a cross-sectional view of another embodiment prepared according to FIG. 1.

Examples of the end product processed in the above manner are shown in FIG. 3 and FIG. 4.

According to the method and the apparatus of the present invention, chips of various colors and shapes can be uniformly arranged on a substrate by a simple process. As a result of the invention, there is no need for a separate process in which the substrate should be vibrated because there is no occurrence of overlapping chips. In addition, the adherence of the chips can be more uniformly retained by not vibrating the substrate. Therefore, the present invention can provide aesthetically beautiful mosaic floor decorations having an even surface and which is quite durable.

The present invention is further described in detail by the non-limiting examples given below.

EXAMPLE 1

A mineral paper substrate having a thickness of 0.7 mm was covered with plastisol comprising 100 parts by weight of paste resin, 60 parts by weight of plasticizer, 4 parts by weight of stabilizer and 0.3 parts by weight of pigment in order to form a base sol layer having a thickness of 0.4 mm. Chips having a thickness of 1.3 mm and a width and a length of 5 to 10 mm, comprising 100 parts by weight of straight resin, 200 parts by weight of calcium carbonate, 30 parts by weight of plasticizer, 7 parts by weight of stabilizer and 14 parts by weight of pigment were supplied through a sliding-table having many inclines to a horizontal plane. The angles of the slope to the horizontal plane are 15°, 10°, 15°, 7° and 14°. The sliding table is vibrated from side to side by a mechanical motor and a fixed-arrangement plate equipped at the end of the sliding-table. The chips were arranged uniformly in a mosaic-like design shape on a substrate which was covered with plastisol.

The abovementioned sheet was then heat-treated in a heater at 195° C. for 5 minutes and subsequently passed through a pair of Embo Units (e.g. embossing means). The spaces between the chips were filled with a filling sol having a viscosity of 1,200 CPS (e.g. the same composition as the above plastisol) and any filling sol adhering to the chips was removed by using a rubber plate. The resultant sheet was again heated in a heater at 185° C. for 4 minutes, and then passed through a pair of Embo Units to obtain the final product.

EXAMPLE

A mineral paper substrate having a thickness of 1.O mm was covered with plastisol comprising 100 parts by weight of paste resin, 53 parts by weight of plasticizer, 2.5 parts by weight of stabilizer and 0.8 parts by weight of pigment to form a base sol layer having a thickness of 0.35 mm.

Amorphous chips having a thickness of 0.9 mm and a mean diameter of about 10 to 15 mm, comprising 100 parts by weight of straight resin, 150 parts by weight of calcium carbonate, 35 parts by weight of plasticizer, 6 parts by weight of stabilizer and 8 parts by weight of pigment were supplied through the sliding-table having many inclines to a horizontal plane. The angles of the slope to the horizontal plane are 17°, 12°, 18°, 10° and 15°. The sliding table is vibrated from side to side by an electromagnetic method and a fixed-arrangement plate is equipped at the end of the sliding-table. The chips were arranged uniformly in a mosaic-like design on a substrate covered with plastisol.

The above mentioned sheet was then heat-treated in a heater at 180° C. for 5 minutes and subsequently passed through a pair of Embo Units (e.g. embossing means). The space between the chips were filled with a filling sol having a viscosity of 1,400 CPS (e.g. the same composition as the above plastisol), and any filling sol adhering to the chips was removed by using a metallic plate having a thickness of 0.5 mm.

The resultant sheet was heated in a heater at 195° C. for 3 minutes and then passed through a pair of Embo Units (e.g. embossing means) to obtain the final product.

EXAMPLE 3

A mineral paper substrate having a thickness of 0.6 mm was covered with plastisol comprising 100 parts by weight of paste resin, 63 parts by weight of stabilizer and 1.0 part by weight of pigment to form the base sol layer having a thickness of 0.3 mm. Chips having a thickness of 1.1 mm and a width and length of 6 to 12 mm, comprising 100 parts by weight of straight resin, 250 parts by weight of calcium carbonate, 40 parts by weight of plasticizer, 8 parts by weight of stabilizer and 12 parts by weight of pigment were supplied through the sliding-table having many inclines to a horizontal plane. The angles of the slope to the horizontal plane are 19°, 13°, 18°, 11°, 14° and 9°. The sliding-table is vibrated from side to side by a mechanical motor and a fixed-arrangement plate is equipped at the end of the sliding-table. The chips were arranged uniformly in a mosaic-like design on a substrate which was covered with plastisol.

The above-mentioned sheet was then heat-treated in a heater at 190° C. for 4 minutes and subsequently passed through a pair of Embo Units (e.g. embossing means). The spaces between the chips were filled with a filling sol having a viscosity of 1,500 CPS (e.g. the same composition as the above plastisol), and any filling sol adhering to the chips was removed by using a metallic plate having a thickness of 0.3 mm.

The substrate was again heated in a heater at 200° C. for 3 minutes and covered with a transparent plastisol comprising 100 parts by weight of paste resin, 63 parts by weight of plasticizer and 6 parts by weight of stabilizer. The resultant sheet was heated in a heater at 195° for 4 minutes and passed through a pair of Embo Units (e.g. embossing means) to obtain the final product.

Therefore, according to the present invention, the appearance of the prepared product is good when compared with previous mosaic floor decorations and products. Moreover, the present invention provides products having a uniform thickness. Also, because of the good compatibility between the base sol layer and the surface resin layer, floor decorations having good endurance or durability can be prepared.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process for the preparation of a mosaic floor, which comprises:

coating a substrate with base sol, dispersing and uniformly arranging chips upon the substrate by supplying the chips through a sliding-table having a plurality of slopes having many different incline angles and which is operatively associated with a fixed-arrangement plate at an end of the sliding-table, heating the arranged chips, and applying an effective amount of pressure to the chips for fusing the chips.

2. The process according to claim 1, wherein the sliding table is vibrated from side to side by mechanical or electrical means.

3. The process according to claim 1, further comprising controlling the sliding rate of the chips by varying the coefficient of friction of the sliding table.

4. An apparatus for the preparation of a mosaic floor decoration, comprising:

a sliding-table having a plurality of slopes having different incline angles, wherein the mean of the incline angles to a horizontal plane of a slope in the sliding-table is 5° -20° and wherein differing incline angles in the slope are continuously joined to form an inclined shape, a fixed-arrangement plate operatively associated with an end of the sliding-table, and means for vibrating the sliding table.

5. The apparatus according to claim 4, wherein the length of the sliding-table is at least 0.5 m.

6. The apparatus according to claim 4, wherein the slope of the sliding-table comprises five inclines having an angle of the slope to a horizontal plane of about 13° to 20°, about 8° to 13°, about 13° to 20°, about 7° to 12° and about 11° to 17°.

7. The apparatus according to claim 4, wherein a fixed-arrangement plate has a coefficient of friction of one half to four times that of the slope of a sliding table.

8. The apparatus according to claim 4, wherein the incline angle of the plurality of slopes alternate such that a first alternating slope has a relatively larger angle than a second alternating slope.

9. The apparatus according to claim 4, wherein the coefficient of friction of the fixed arrangement plate is larger than that of the sliding-table.

10. An apparatus for the preparation of a mosaic floor decoration, comprising:

a sliding-table having a plurality of slopes having different incline angles, wherein the mean of the incline angles to a horizontal plane of a slope in the sliding-table is 5°-20°, differing incline angles in the slopes are continuously joined to form an inclined shape, and the incline angles of the plurality of slopes alternate such that a first alternating slope has a relatively larger angle than a second alternating slope, a fixed-arrangement plate operatively associated with an end of the sliding-table, wherein the coefficient of friction of the fixed arrangement plate is larger than that of the sliding-table, and means for vibrating the sliding table.

* * * * *